Aug. 22, 1933.                G. LARSEN                1,923,269
       FASTENING CLIP FOR FOUNTAIN PENS, PENCILS, AND
            THE LIKE AND ATTACHING MEANS THEREFOR
                      Filed May 8, 1930
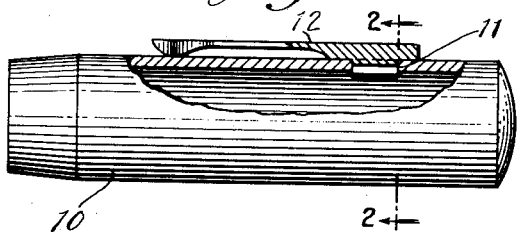
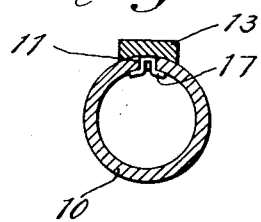
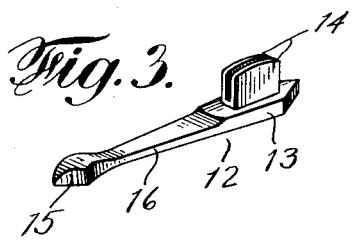
INVENTOR
Gabriel Larsen
BY
ATTORNEYS Patented Aug. 22, 1933

1,923,269

UNITED STATES PATENT OFFICE 1,923,269

FASTENING CLIP FOR FOUNTAIN PENS, PENCILS, AND THE LIKE AND ATTACHING MEANS THEREFOR

Gabriel Larsen, Springfield, N. J., assignor to L. E. Waterman Company, New York, N. Y., a Corporation of New York Application May 8, 1930. Serial No. 450,681

5 Claims. (Cl. 24—11)

In fastening clips for fountain pens and the like, it has been the general practice to make them of two pieces, a clip body portion and a ball portion. The former is usually made of sheet metal and is provided with a broadened end through which rivets or other fasteners may be passed to hold the clip to the pen or pencil cap, and a shank which is more or less resilient, this resilience arising from the temper given the metal in rolling the sheet from which the clip body is cut. The ball portion is attached to the end of the shank, and the spring-like shank holds it yieldingly against the cap.

It is the object of my present invention to provide a clip which will be more sightly than those heretofore made and one which may be made with all the parts integral, and yet will be inexpensive to manufacture and effective in use.

My invention will best be understood by reference to the accompanying drawing, in which I have illustrated a preferred embodiment of my invention, and in which Fig. 1 is a side view, partially broken away, of a cap for a fountain pen, and a fastening clip attached thereto; Fig. 2 is a section taken on the line 2—2 of Fig. 1, and Fig. 3 is a perspective view illustrating the clip shown in Figs. 1 and 2, but before it is attached to the cap.

Like reference characters indicate like parts throughout the drawing.

In the illustrative embodiment, the clip has a portion 13 provided with a pair of fastening wings 14 integral with plate 13. The shank 16 joins plate 13 at 12, and at the other end of the shank and integral with it is a thickened part 15, which, for convenience, will be designated as the "ball". The wings 14 are located inside the boundaries of plate 13, extend longitudinally of the clip, and are relatively close to each other and near the center of the plate.

In Figs. 1 and 2, the clip of Fig. 3 is shown attached to a cap. A longitudinal slot 11 is provided in the cap and the wings 14 inserted in it and then bent, as at 17, to hold the clip to the cap. By this mode of attachment, a single slot suffices and, by making the wings relatively long, the clip is held against any sidewise movement.

The clip is usually of German silver or gold, and if the wing portions and the "ball" are integral with the body portion of the clip, the clip may be made by striking up a piece of metal in suitable dies. But the blank from which such a clip is formed cannot be rolled and therefore has no initial resilience and there would be no spring-like action to the shank, as is necessary in a clip. I have found, however, that all of the metals of which it is desirable to make a clip may be given sufficient "temper" or resilience in the shank of my clip if that portion of the dies which strike up the shank and the means for bringing together such dies are arranged to strike up this part of the clip under great pressure with a heavy blow. Because of the greater mass of metal at the two ends of the clip, the "ball" and the wings may not receive so much "temper" as the shank, but that is immaterial, because no "temper" is necessary in those parts.

By locating the lugs intermediate the boundaries of the clip, the same are not visible when the clip is secured in position on the cylindrical member, and the entire clip thereby presents a more sightly appearance than would be the case if the lugs or a portion thereof were visible. By locating them near the center line of the clip, a single narrow slot in the cap may be used. By locating them away from the boundaries, the shape of the plate may be of any ornamental form desired, without affecting the fastening means.

The arrangement may be varied in many respects. It is not necessary to form the ball and the wings integral with the shank and plate, respectively. The wings may be formed of a separate piece and soldered or riveted to the plate. The wings may extend crosswise of the plate, though that is not so desirable as the illustrative form.

I claim:

1. A fastening clip of the class described formed of a single piece of relatively soft non-resilient metal, said piece being relatively thick as compared to the thickness of sheet metal employed for such articles, said clip having one end portion thereof in the form of a relatively thick part of the piece, and having a relatively thin shank extending from and integral with said end portion and highly compressed from a thick part of said piece to render it resilient.

2. A fastening clip of the class described formed of a single piece of relatively soft non-resilient metal, said piece being relatively thick as compared to the thickness of sheet metal employed for such articles, said clip having one end portion thereof in the form of a relatively thick plate, and having a relatively thin shank extending from and integral with said plate and highly compressed from a thick part of said piece to render it resilient, and means for securing said plate to a pen or the like.

3. A fastening clip of the class described formed of a single piece of relatively soft non-resilient metal, said piece being relatively thick as compared to the thickness of sheet metal employed for such articles, said clip having one end portion thereof in the form of a relatively thick plate, and having a relatively thin shank extending from and integral with said plate and highly compressed from a thick part of said piece to render it resilient, and fastening wings integral with said plate and located inside the edges thereof, said wings being adapted to pass through the wall of a pen barrel or the like.

4. A fastening clip of the class described formed of a single piece of relatively soft non-resilient metal, said piece being relatively thick as compared to the thickness of sheet metal employed for such articles, said clip having one end portion thereof formed of a relatively thick plate and the other end of a relatively thick ball, said plate and ball being connected by a shank integral therewith and highly compressed from a thick part of said piece to render it resilient, end means for securing said plate to a pen or the like.

5. A fastening clip of the class described formed of a single piece of relatively soft non-resilient metal, said piece being relatively thick as compared to the thickness of sheet metal employed for such articles, said clip having one end portion thereof formed of a relatively thick plate and the other end of a relatively thick ball, said plate and ball being connected by a shank integral therewith and highly compressed from a thick part of said piece to render it resilient, and fastening wings integral with said plate and located inside the edges thereof, said wings being adapted to pass through the wall of a pen barrel or the like.

GABRIEL LARSEN.